United States Patent Office 2,801,229
Patented July 30, 1957

2,801,229

CURING GLYCIDYL POLYETHERS

Ronald L. De Hoff, Springfield, and Harvey L. Parry, Union, N. J., assignors to Shell Development Company, Emeryville, Calif., a corporation of Delaware No Drawing. Application July 29, 1953,
Serial No. 371,148

5 Claims. (Cl. 260—47)

This invention relates to a process for resinifying a glycidyl polyether with a special amino curing agent, and to the very useful products therefrom.

Glycidyl polyethers have been heretofore subjected to cure with various basic substances including some amines. We have now discovered that unexpectedly improved resinification of glycidyl polyethers having a 1,2-epoxy equivalency greater than 1.0 is obtained by effecting cure with a particular aromatic diamine, namely, meta-phenylene diamine or 1,3-diaminobenzene. The cured resinous product of the process of the invention has the valuable properties of retaining hardness and strength at quite elevated temperatures as well as having exceptional resistance against the action of powerful organic solvents. In these respects, the product of the invention is unique as compared to known resins obtained by curing the glycidyl polyether with prior amines.

It has also been found that m-phenylene diamine will react with glycidyl polyethers of dihydric phenols to form a product that is soluble and fusible, and retains this state of cure for a relatively long period of time. This fusible product is particularly useful in commercial applications of the invention such as laminating and molding as will be evident from the description given hereinafter.

According to the process of the invention, meta-phenylene diamine is mixed and reacted with glycidyl polyether having a 1,2-epoxy equivalency greater than 1.0 whereby there is formed a resinous product. Although reaction of the mixture occurs slowly at temperatures as low as about 20° C., conversion to a hard tough solvent-resistant resinous product is effected generally at about 50° C. to 280° C., excellent results being obtained at from about 90° C. to 200° C., particularly from about 100° C. to 175° C.

Resinification of the mixture of glycidyl polyether and amine occurs in several stages. Upon the amine reacting with polyether, there is first formed a resinous product which is fusible and soluble in acetone. Continued curing then gives the fixed resinous product which is characterized by being hard and infusible. At elevated curing temperatures, the different states of cure flow from one to the other without interruption. However, it is often useful to arrest the curing reactions before infusibilization occurs. This is accomplished by cooling below a temperature of about 40° C. Although the fusible resinous product does not appear to have indefinite life in the state of fusibility at such low temperature, it does remain readily fusible for a number of weeks when kept at about 20 to 25° C., and it also remains soluble in acetone during this period. This unique property of the fusible resinous product along with its normally solid, non-tacky character makes it very useful.

Although it is desirable to mix the meta-phenylene diamine with the glycidyl polyether in such proportion that there is present about 0.25 mol of the diamine per epoxide equivalent weight of the glycidyl polyether, the proportion may be varied widely. Thus, in general, there is used about 0.12 or 0.15 to 0.75 mol of the diamine per epoxide equivalent weight of the polyether, and the preferred proportion of the diamine mixed with the polyether is such that there is present from about 0.2 to 0.4 mol of diamine per epoxide equivalent weight of polyether.

The glycidyl polyethers employed in the invention are obtainable from reaction of epichlorhydrin and polyhydric phenols or alcohols in an alkaline medium. There is preferably used glycidyl polyether of a polyhydric phenol, including pyrogallol, phloroglucinol, and novolac resins, but particularly of a dihydric phenol. Such polyethers are obtained by heating the dihydric phenol with epichlorhydrin at about 50° C. to 150° C. using 1 to 2 or more of epichlorhydrin per mol of dihydric phenol. Also present is a base, such as sodium or potassium hydroxide in slight stoichiometric excess to the epichlorhydrin, i. e., about 2% to 30%. The heating is continued for several hours to effect the reaction and the product is then washed free of salt and base. The product, instead of being a single simple compound, is generally a complex mixture of glycidyl polyethers, but the principal product may be represented by the formula

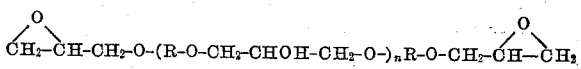

wherein $n$ is an integer of the series 0, 1, 2, 3 . . . , and R represents the divalent hydrocarbon radical of the dihydric phenol. While for any single molecule of the polyether $n$ is an integer, the fact that the obtained polyether is a mixture of compounds causes the determined value for $n$, e. g., from molecular weight measurement, to be an average which is not necessarily zero or a whole number. Although the polyether is a substance primarily of the above formula, it may contain some material with one or both of the terminal glycidyl radicals in hydrated form.

The simplest of such polyethers is the diglycidyl diether of a dihydric phenol. It contains a single divalent aromatic hydrocarbon radical from the dihydric phenol and has two glycidyl radicals linked thereto by ethereal oxygen atoms. More generally, the polyether of dihydric phenols is of more complex character and contains two or more aromatic hydrocarbon radicals alternating with glyceryl groups in a chain which are linked together by intervening ethereal oxygen atoms.

The glycidyl polyether used in the invention have a 1,2-epoxy equivalency greater than 1.0. By the epoxy equivalency reference is made to the average number of 1,2-epoxy groups

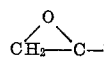

contained in the average molecule of the glycidyl ether. Owing to the method of preparation of the glycidyl polyethers and the fact that they are ordinarily a mixture of chemical compounds having somewhat different molecular weights and contain some compounds wherein the terminal glycidyl radicals are in hydrated form, the epoxy equivalency of the product is not necessarily the integer 2 even when derived from a dihydric phenol or alcohol. However, in all cases it is a value greater than 1.0. The 1,2-epoxy equivalency of the polyether of dihydric compounds is a value between 1.0 and 2.0.

The 1,2-epoxide value of the glycidyl polyether is determined by heating a weighed sample of the ether with an excess of 0.2 N pyridinium chloride in chloroform solution at the boiling point under reflux for two hours whereby the pyridinium chloride hydrochlorinates the epoxy groups to chlorhydrin groups. After cooling, the excess pyridinium chloride is back-titrated with 0.1 N sodium hydroxide in methanol to the phenolphthalein end point. This method is used for obtaining all epoxide value discussed herein. By the term epoxide equivalent weight reference is made to the weight of glycidyl polyether which contains and is equivalent to one 1,2-epoxy group. For example, the glycidyl polyether of 2,2-bis (4-hydroxyphenyl)propane designated herein as polyether A, has a measured epoxy value of 0.538 epoxy equivalent per 100 grams and a measured molecular weight of 360. The 1,2-epoxy equivalency of polyether A is, therefore, 1.93 and the epoxide equivalent weight is 186. In using 0.25 mol of meta-phenylene diamine per epoxide equivalent weight of this polyether about 14.5 parts of the diamine is mixed in 100 parts by weight of the polyether.

Any of the various dihydric phenols is used in preparing the polyethers including mononuclear phenols such as resorcinol, hydroquinone, methyl resorcinol, etc., or polynuclear phenols like 2,2-bis(4-hydroxyphenyl)propane which is termed bis-phenol herein for convenience, 4,4'-dihydroxybenzophenone, bis(4-hydroxyphenyl)methane, 1,1-bis(4-hydroxyphenyl)ethane), 1,1-bis(4-hydroxyphenyl)isobutane, 2,2-bis(4-hydroxyphenyl)butane, 2,2-bis(4-hydroxy-2-methylphenyl)propane, 2,2-bis(4-hydroxy-2-tertiary-butylphenyl)propane, 2,2-bis(2-hydroxynaphthyl)pentane, 1,5-dihydroxynaphthalene, etc.

Preferred polyethers are prepared from 2,2-bis(4-hydroxyphenyl)propane. They contain a chain of alternating glyceryl and 2,2-bis(4-phenylene)propane radicals sepaarted by intervening ethereal oxygen atoms and have a 1,2-epoxy equivalency between 1.0 and 2.0, and an epoxide equivalent weight of about 175 to 600, preferably from about 175 to 370. A particularly suitable material for use in the invention is the normally liquid glycidyl polyether of bis-phenol having an epoxide equivalent weight of about 180 to 220, and a 1,2-epoxy equivalency of about 1.8 to 1.95. With glycidyl polyether of 2,2-bis(4-hydroxyphenyl)propane having a 1,2-epoxy equivalency between 1.0 and 2.0 and the epoxide equivalent weight of about 175 to 600, there is preferably used about 0.12 to 0.5 mol of the meta-phenylene diamine per epoxide equivalent weight of the polyether.

Also suitable for use in the invention are glycidyl polyethers of polyhydric alcohols. Because they contain a plurality of glycidyl groups such substances are capable of curing in the same manner as that of the glycidyl polyethers of polyhydric phenols. Among representative compounds of this class are diglycidyl ethers of ethylene glycol, propylene glycol, trimethylene glycol, butylene glycol, diethylene glycol, triethylene glycol, glycerol, tripropylene glycol, and the like, as well as ethers containing more than two glycidyl groups such as the glycidyl polyethers of glycerol, diglycerol, erythritol, pentaglycerol, pentaerythritol, mannitol, sorbitol, polyallyl alcohol, polyvinyl alcohol, and the like. Such glycidyl polyethers also have a 1,2-epoxy value greater than 1.0.

The glycidyl polyethers of the polyhydric alcohols are preferably prepared by reacting the polyhydric alcohol with epichlorhydrin in the presence of 0.1 to 2% of an acid-acting compound as catalyst such as boron trifluoride, hydrofluoric acid or stannic chloride whereby the chlorhydrin ether is formed as product. The reaction is effected at about 50° C. to 125° C. with the proportions of reactants being such that there is about one mol of epichlorhydrin for each molecular equivalent of hydroxyl group in the polyhydric alcohol. Thus, in preparing the ether of diethylene glycol, which glycol contains two hydroxyl groups in each molecule thereof, about two mols of epichlorhydrin for each mol of diethylene glycol are used. The resulting chlorhydrin ether from the reaction of a polyhydric alcohol with epichlorhydrin is dehydrochlorinated by heating at about 50° C. to 125° C. with a small, say 10%, stoichiometrical excess of a base. For this purpose, sodium aluminate gives good results.

The glycidyl polyethers will be more fully understood from consideration of the following described preparations and the properties of the products.

POLYETHER A

Bis-phenol is dissolved in epichlorhydrin in the proportion of 5130 parts (2.5 mols) of bis-phenol in 20,812 parts (225 mols) of epichlorhydrin and 104 parts of water. The solution is prepared in a kettle provided with heating and cooling equipment, agitator, distillation condenser and receiver. A total of 1880 parts of solid 97.5% sodium hydroxide, corresponding to 2.04 mols of sodium hydroxide per mol of bis-phenol (2% excess) is added in installments. The first installment of 300 parts of sodium hydroxide is added and the mixture heated with efficient agitation. The heating is discontinued as the temperature reaches 80° C. and cooling is started in order to cool the exothermic heat of reaction. The control is such that the temperature rises only to about 100° C. When the exothermic reaction has ceased and the temperature has fallen to 97° C., a further addition of 316 parts of sodium hydroxide is made and similar further additions are effected at successive intervals. An exothermic reaction takes place after each addition. Sufficient cooling is applied so there is gentle distillation of epichlorhydrin and water, but the temperature is not allowed to go below about 95° C. No cooling is necessary after the final addition of sodium hydroxide. After the last addition of sodium hydroxide with completion of the reaction the excess epichlorhydrin is removed by vacuum distillation with use of a kettle temperature up to 150° C. and a pressure of 50 mm. Hg. After completion of the distillation, the residue is cooled to about 90° C. and about 360 parts of benzene added. Cooling drops the temperature of the mixture to about 40° C. with precipitation of salt from the solution. The salt is removed by filtration and the removed salt carefully washed with about an additional 360 parts of benzene to remove polyether therefrom. The two benzene solutions are combined and distilled to separate the benzene. When the kettle temperature reaches 125° C., vacuum is applied and distillation continued to a kettle temperature of 170° C. at 25 mm. pressure. The resulting glycidyl polyether of bis-phenol has a Durrans' mercury method softening point of 10° C., an average molecular weight of 360 ebullioscopic measurement in ethylene dichloride, and an epoxide value of 0.538 epoxy equivalents per 100 grams. It has an epoxide equivalent weight of 186 and a 1,2-epoxy equivalency of 1.93. The product is designated herein as polyether A.

POLYETHER B

A solution consisting of 11.7 parts of water, 1.22 parts of sodium hydroxide, and 13.38 parts of bis-phenol is prepared by heating the mixture of ingredients to 70° C. and then cooling to 46° C. at which temperature 14.06 parts of epichlorhydrin are added while agitating the mixture. After 25 minutes has elapsed, there is added during an additional 15 minutes' times a solution consisting of 5.62 parts of sodium hydroxide in 11.7 parts of water. This causes the temperature to rise to 63° C. Washing with water at 20° C. to 30° C. temperature is started 30 minutes later and continued for 4½ hours. The product is dried by heating to a final temperature of 140° C. in 80 minutes, and cooled rapidly. At room temperature, the product is an extremely viscous, semi-solid having a softening point of 27° C. by Durrans' mercury method, an epoxide equivalent weight of 245 and a molecular weight of 460. The 1,2-epoxy equivalency is 1.88. This product will be referred to hereinafter as polyether B.

POLYETHER C

Polyethers of higher molecular weight are prepared by using smaller ratios of epichlorhydrin to bis-phenol. In a vessel fitted with an agitator, 228 parts (1 mol) of bis-phenol and 86 parts (2.14 mols) sodium hydroxide as a 10% aqueous solution are introduced and heated to about 45° C. whereupon 188 parts (2.04 mols) of epichlorhydrin are added rapidly while agitating the mixture. The temperature of the mixture is then gradually increased and maintained at about 95° C. for 80 minutes. The mixture separates into a two-phase system and the aqueous layer is drawn off from the taffy-like product which forms. The latter is washed with hot water while molten until the wash water is neutral to litmus. The product is then drained and dried by heating to a final temperature of 103° C. The softening point of the resulting glycidyl polyether is 43° C. The measured molecular weight of the product is 520 and it has an epoxide value of 0.29 epoxy equivalent per 100 grams. The epoxide equivalent weight is 345 and the 1,2-epoxy equivalency is 1.8. It will be identified hereinafter as polyether C.

POLYETHER D

This glycidyl polyether is prepared in like manner to that of polyether C except that for each mol of bis-phenol there is employed 1.57 mols of epichlorhydrin and 1.88 mols of sodium hydroxide. The resulting polyether has a softening point of 70° C. by Durrans' mercury method, a molecular weight of 900 as measured ebullioscopically in ethylene dichloride, and epoxide value of 0.20 epoxy equivalent per 100 grams. The epoxide equivalent weight is 500, and the 1,2-epoxy equivalency is 1.8.

POLYETHER E

Preparation of glycidyl polyethers of polyhydric alcohols may be illustrated by considering preparation of the glycidyl polyether of glycerol, a typical member of the group.

In parts by weight, about 276 parts of glycerol (3 mols) are mixed with 828 parts of epichlorhydrin (9 mols). To this reaction mixture are added 10 parts of a diethyl ether solution containing about 4.5% of boron trifluoride. The temperature rises as a result of the exothermic reaction and external cooling with ice water is applied so as to keep the temperature between about 50° C. and 75° C. during a reaction period of about 3 hours. About 370 parts of the resulting glycerol-epichlorhydrin condensate are dissolved in 900 parts of dioxane containing about 300 parts of sodium aluminate. While agitating, the reaction mixture is heated and refluxed at 93° C. for 9 hours. After cooling to atmospheric temperature, the insoluble material is filtered from the reaction mixture and low boiling substances removed by distillation to a temperature of about 205° C. at 20 mm. pressure. The glycidyl polyether, in amount of 261 parts, is a pale yellow, viscous liquid. It has an epoxide value of 0.645 epoxide equivalent per 100 grams and the molecular weight is 320, as measured ebullioscopically in a dioxane solution. The 1,2-epoxy equivalency is 2.1 and the epoxide equivalent weight is 155.

In executing the process of the invention, it is desirable to have the glycidyl polyether in a mobile liquid condition when the diamine curing agent is added in order to facilitate mixing. The glycidyl polyethers of polyhydric phenols are generally very viscous to solid materials at ordinary temperature. With those that are liquid, but too viscous for ready mixing, they are either heated to reduce the viscosity, or have a liquid solvent added thereto in order to provide fluidity. Normally solid members are likewise either melted or mixed with a liquid solvent. Various solvents are suitable for achieving fluidity of the glycidyl polyethers. These may be volatile solvents which escape from the polyether compositions containing the diamine by evaporation before or during the curing such as ketones like acetone, methyl ethyl ketone, methyl isobutyl ketone, isophorone, etc., esters such as ethyl acetate, butyl acetate, Cellosolve acetate (ethylene glycol monoacetate), methyl Cellosolve acetate (acetate of ethylene glycol monomethyl ether), etc., ether alcohols such as methyl, ethyl or butyl ether of ethylene glycol or diethylene glycol; chlorinated hydrocarbons such as trichloropropane, chloroform, etc. To save expense, these active solvents may be used in admixture with aromatic hydrocarbons such as benzene, toluene, xylene, etc., and/or alcohols such as ethyl, isopropyl or n-butyl alcohol. Solvents which remain in the cured compositions may also be used, such as diethylphthalate, dibutylphthalate, or liquid mono-epoxy compounds including glycidyl allyl ether, glycidyl phenyl ether, styrene oxide, 1,2-hexylene oxide, glycide, and the like, as well as cyano-substituted hydrocarbons, such as acetonitrile, propionitrile, adiponitrile, benzonitrile, and the like. It is also convenient to employ a glycidyl polyether of the dihydric phenol in admixture with a normally liquid glycidyl polyether of a polyhydric alcohol. In fact, two or more of any of the glycidyl polyethers may be used together as mixtures. In such cases, the amount of diamine added and commingled is based on the average epoxide equivalent weight of the glycidyl polyether mixture.

Various other ingredients may be mixed with the glycide polyether subjected to cure with the metaphenylene diamine including pigments, fillers, dyes, plasticizers, resins, and the like.

One important application of the invention is the production of laminates or resinous articles reinforced with fibrous textiles. Although it is generally preferred to utilize glass cloth for this purpose, any of the other suitable fibrous materials in sheet form may be employed such as glass matting, paper, asbestos paper, mica flakes, cotton bats, duck muslin, canvas and the like. It is useful to prepare the laminates from woven glass cloth that has been given prior treatment with well known finishing or sizing agents therefor, such as chrome methacrylate or vinyl trichlorsilane.

In preparing the laminate, the sheets of fibrous material are first impregnated with the mixture of glycidyl polyether and diamine. This is conveniently accomplished by dissolving the diamine in acetone and mixing the solution with the polyether so as to obtain a fluid mixture. The sheets of fibrous material are impregnated with the mixture by spreading it thereon or by dipping or otherwise immersing them in the impregnant. The solvent is conveniently removed by evaporation and the mixture is cured to the fusible resin stage. Although this operation may be conducted at room temperature (20 to 25° C.), it is preferred to use somewhat elevated temperature such as about 50° C. to 200° C. with the impregnated sheet stock passing through or hanging free in an oven or other suitable equipment. The resinification is arrested before infusible product occurs by cooling below about 40° C., preferably to about 20 to 25° C. A plurality of the impregnated sheets are then superposed and the assembly is cured in a heated press under a pressure of about 25 to 500 or more pounds per square inch. The resulting laminate is extremely strong and resistant against the action of organic and corrosive solvents.

Another important use of the invention is the production of molded articles. A molding powder is first prepared by milling together a mixture of a glycidyl polyether and meta-phenylene diamine along with customary fillers and mold release agents. Usually the milled mixture is set up so that the fusible resin is contained therein. The milled mixture is then ground and molded articles are prepared therefrom with conversion of the fusible resin into the infusible state with use of molding machines such as those for compression molding or transfer molding. If desired, the fusible milled mixture may be prepared in pre-form pellets and the like.

While desirable, it is not necessary that the meta-phenylene diamine used in the invention be in absolutely pure condition. Commercial meta-phenylene diamine which contains various impurities gives satisfactory results. Furthermore, it is useful at times to employ the meta-phenylene diamine in combination with other amines or substances. Eutectic mixtures are advantageous on occasion. For example, a mixture of about 70 to 80% meta-phenylene diamine and 20 to 30% ortho-phenylene diamine has a melting point of only about 43° C. and is useful for this reason. Other desirable eutectics include the mixture of meta-phenylene diamine and meta-aminophenol containing about 63% of the former which melts at about 24° C., and the mixture of meta-phenylene diamine and meta-dinitrobenzene containing about 55% of the former and melts at 37° C. A eutectic comprising 60 to 70% meta-phenylene diamine and 30 to 40% p,p'-diaminodiphenyl methane is a stable liquid for 5 to 6 days at 20 to 30° C. after preparation. More complex eutectic mixtures containing meta-phenylene diamine and two or more other substances may also be used. In some cases, mixtures of meta-phenylene diamine with carboxylic acids are also useful. While mixtures of chemically equivalent amounts of the diamine and the acid may be used, it has been found that the presence of a relatively lesser proportion of acid such as 2-ethylhexoic acid acts as an accelerator and speeds up the rate of cure without adverse effect.

The following examples are given for the purpose of illustrating the invention, but the scope thereof is not to be construed as limited necessarily to details described in the examples. The parts and percentages are by weight.

Example 1

For the purpose of comparing the curing characteristics of m-phenylene diamine with various other amines with respect to the retention of hardness of the resinified products at elevated temperatures (hot hardness), a series of resins were prepared from polyether A and the amines listed in the table below. Portions of polyether A were heated to 65° C., and the noted amount of amine was stirred in and dissolved. The amines, where solid, were in the form of powder. The mixtures were next cooled to room temperature (about 25° C.), and then all were placed in an air oven regulated to a temperature of 100° C. The castings remained in the oven for a period of 2 hours in order to effect resinification whereupon the hardness was measured with the resins at the tabulated temperatures with a Barcol Impressor. The results follow:

| Amine | Added, Percent Amine | Barcol Hardness at— | | |
|---|---|---|---|---|
| | | 25° C. | 80° C. | 120° C. |
| m-Phenylene diamine | 12.5 | 33 | 19 | 6 |
| o-Phenylene diamine | 12.5 | 31 | 16 | 0 |
| p-Phenylene diamine | 12.5 | 30 | 14 | 0 |
| 2,4-Diaminotoluene | 12.5 | 24 | 10 | 0 |
| p,p'-Diaminodiphenylmethane | 12.5 | 9 | 0 | 0 |
| Triethylene tetramine | 10.0 | 26 | 8 | 0 |
| 2,4,6-Tris (dimethylaminomethyl) phenol | 12.5 | 18 | 0 | 0 |

The foregoing results demonstrate that only with meta-phenylene diamine is there obtained a resinous product having good hardness at 120° C. It may be further noted that a Barcol hardness of zero does not necessarily represent this value on the hardness scale; a zero value may well be less than this hardness or a minus value because the Barcol Impressor is so constructed as to be incapable of measuring hardness which is a negative value.

Another very advantageous and unexpected result was realized with the resinous product of the invention prepared as described above when compared to that from the other isomeric phenylene diamines. The resinous product prepared with use of the meta-phenylene diamine was very light tan in color and was thus substantially the same color as that of the starting polyether A. On the other hand, the resinous product from use of ortho-phenylene diamine was brown in color, and the product from use of para-phenylene diamine was almost black.

In order to determine whether additional curing at higher temperature would give any significant change in the hardness values, the resinous products prepared as described above were heated again for 30 minutes in an air oven regulated to a temperature of 250° C. and the Barcol hardness was measured with the following results:

| Amine Curing Agent | Barcol Hardness at— | | |
|---|---|---|---|
| | 25° C. | 80° C. | 120° C. |
| m-Phenylene diamine | 37 | 21 | 6 |
| o-Phenylene diamine | 38 | 19 | 0 |
| p-Phenylene diamine | 39 | 19 | 0 |
| 2,4-Diaminotoluene | 43 | 15 | 0 |
| p,p'-Diaminodiphenylmethane | 10 | 0 | 0 |
| Triethylene tetramine | 36 | 11 | 0 |

The above results further demonstrate that the resin from use of meta-phenylene diamine is unique in having hot hardness at 120° C.

Example 2

Polyether A was cured with use of the three isomeric phenylene diamines in order to observe further the unexpected hot hardness obtained with use of meta-phenylene diamine and also to observe the unusual resistance of resinous products of the invention against acetone which is a very powerful organic solvent for resins. Portions of polyether A were heated to about 65° C. and the indicated amounts of the isomers tabulated below were added in finely ground form. Gentle heating with stirring was conducted to solubilize and mix the amines in the polyether. The mixtures were then cured in aluminum cups in an air oven at 115° C. for one hour, and the Barcol hardness was measured at this temperature as well as after cooling to room temperature of about 25° C. The resinous products were next weighed and immersed in acetone for 24 hours after which the gain in weight was determined and the Barcol hardness at about 25° C. was again measured. The results follow:

| Isomer | Added, percent Amine | Barcol at— | | After Acetone Immersion | |
|---|---|---|---|---|---|
| | | 25° C. | 115° C. | Barcol at 25° C. | Percent Wt. Increase |
| Meta | 12 | 42 | 10 | 20 | 1.6 |
| Meta | 14 | 34 | 20 | 34 | 0.0 |
| Ortho | 12 | 34 | 0 | 0 | 4.4 |
| Ortho | 14 | 30 | 0 | 0 | 1.4 |
| Para | 12 | 0 | 0 | 0 | 5.7 |
| Para | 14 | 30 | 5 | 0 | 0.3 |

The above results again demonstrate the marked superiority in retention of hardness at the elevated temperature for the resinous product cured with meta-phenylene diamine. Furthermore, the outstanding solvent resistance of the product of the invention, both with respect to decrease absorption of acetone and to retention of hardness after soaking in this active solvent is shown.

Example 3

In order to compare the curing characteristics and physical properties of polyether A cured with meta-phenylene diamine and the corresponding para isomer, fiberglass cloth laminates were prepared and tested. Varnishes were prepared from polyether A containing an added 16% of the amines by dissolving the amine in acetone and stirring this solution into polyether A to give a 60% solids solution. Sheets of fiberglass cloth 181-Volan A were impregnated by painting the solutions on the cloth and then drying them for 30 to 50 minutes at 90° C. while hanging free in an air oven to form nontacky sheets. This treatment resinified the polyether to a fusible product. Assemblies of 12 plies of superposed impregnated cloth were then prepared. The assemblies were cured in a press operating at the temperature indicated in the table below. A curing cycle was used wherein the assembly was first subjected to mere contact pressure for a minute or so and then the pressure was increased to 200 pounds per square inch (p. s. i.). The ultimate flexural strength and modulus of elasticity in bending according to ASTM designation D790–49T of the resulting laminates were determined. The determinations were then repeated after boiling specimens of the laminates in acetone for 3 hours. The marked superiority of the laminates prepared with use of the meta-isomer are evident from the results tabulated below.

| Isomer | Press Temp., °C. | Minutes at Contact | Minutes at 200 p. s. i. | Percent Resin Content | Initial | | After 3 hrs. Boiling Acetone | |
|---|---|---|---|---|---|---|---|---|
| | | | | | Flexural Strength p. s. i. | Modulus, p. s. i. | Flexural Strength p. s. i. | Modulus, p. s. i. |
| Meta | 107 | 3 | 27 | 29 | 79,500 | 3,400,000 | 59,400 | 1,800,000 |
| Para | 104 | 3 | 27 | 33 | 70,500 | 2,900,000 | 28,900 | 930,000 |
| Meta | 143 | 1 | 14 | 20 | 94,200 | 4,200,000 | 96,100 | 2,900,000 |
| Para | 143 | 1 | 14 | 23 | 87,400 | 4,200,000 | 8,900 | 460,000 |
| Meta | 174 | 1 | 14 | 31 | 80,500 | 3,500,000 | 78,700 | 3,500,000 |
| Para | 174 | 1 | 14 | 28 | 75,700 | 3,600,000 | 50,700 | 1,400,000 |

*Example 4*

A molding powder was prepared from polyether A with use of meta-phenylene diamine as curing agent. To 100 parts of polyether A heated to 65° C., 12.5 parts of meta-phenylene diamine was mixed in and the heating at 65° C. was continued for 1¾ hours. The resulting fusible resin was cooled and ground up to 60 mesh powder. A molding mixture was prepared containing 100 parts of the resin powder, 67 parts of alpha-cellulose flock, 4 parts of titanium dioxide powder and 2 parts of ground calcium stearate. The ingredients were thoroughly mixed and then milled together for 5 minutes with the front roll at 70° C. and the back roll cold. The milled sheet was ground to give the molding powder.

To test the stability of the formed fusible resin, discs were molded at one week intervals from the batch of molding powder using a cycle of 5 minutes at 180° C. with a pressure of 6,400 p. s. i. The molding powder was stored at room temperature (20 to 25° C.) during the interim. The Barcol hardness of the discs was measured at 25° C. and at 100° C. with the following results:

| Weeks Molding Powder Stored | Barcol Hardness at— | |
|---|---|---|
| | 25°C. | 100°C. |
| 0 | 42 | 20 |
| 1 | 44 | 19 |
| 2 | 46 | 18 |
| 3 | 42 | 19 |
| 4 | 43 | 20 |
| 5 | 43 | 21 |

*Example 5*

Polyether B in amount of 100 parts was heated at 65° C. and 16 parts of molten meta-phenylene diamine was mixed in with stirring. The mixture was placed in an air oven at about 115° C. for an hour. A resinified product was obtained which had a Barcol hardness of 28 at 25° C.

*Example 6*

One hundred parts of polyether C was heated to 70° C. and 16 parts of meta-phenylene diamine in molten condition was added with stirring. The mixture was then cured in an air oven at about 115° C. for an hour to give a resinous product having a Barcol hardness of 23 at 25° C.

*Example 7*

Polyether D in amount of 100 parts was heated and melted at about 125° C. whereupon 15 parts of molten meta-phenylene diamine was added with stirring. The mixture gelled in about 5 minutes at about 125° C. The gel was heated at 130° C. for 30 minutes followed by heating at 150° C. for an additional 30 minutes to produce a resinous product having a Barcol hardness of 35 at 25° C.

*Example 8*

One hundred parts of polyether E was heated to 65° C. and 20 parts of meta-phenylene diamine in molten condition was added with stirring. The mixture was placed in an air oven at 110° C. with gelation occurring in about 5 minutes and a resinous product forming that was hard even though still hot.

*Example 9*

Molding powders were prepared from the various glycidyl polyethers listed in the table below. To 100 parts of each polyether, there were mixed the tabulated amount of powdered meta-phenylene diamine, 50 parts of alpha-cellulose flock, and 1.5 parts of calcium stearate. The mixtures were cold milled on a two roll mill until well dispersed and allowed to stand overnight at room temperature to permit formation of the fusible resin. The materials were then ground in a Wiley mill to give the molding powders. Molded cups were formed from the powders according to the procedure of ASTM designation D731–50 using a 10-ton pressure and a temperature of 143° C. at various curing times. The Barcol hardness at 25° C. of the resinous cups are given in the table below along with the flow time.

| Polyether | A | B | C | D |
|---|---|---|---|---|
| m-Phenylene diamine, parts | 16 | 10.5 | 9 | 6 |
| Flow time, secs | 7 | 6 | 7.5 | 7.5 |
| Barcol hardness at Cure Time of: | | | | |
| 5 min | 43 | 30 | 32 | 28 |
| 3 min | 38 | 30 | 25 | |
| 2 min | 34 | 30 | 10 | |
| 1 min | 33 | | | |

*Example 10*

The variation in hot and cold hardness was determined for polyether A cured with different proportions of meta-phenylene diamine. Portions of polyether A were heated to about 65° C. and the added percentage given in the following table of molten meta-phenylene diamine was stirred in and dissolved after which the mixtures were cured for 2 hours at 125° C. The Barcol hardness of the resinous products was measured at 60° C. and at 25° C.

| Added Percent n-Phenylene Diamine | Barcol Hardness at— | |
|---|---|---|
| | 25° C. | 60° C. |
| 10 | 24 | 23 |
| 12 | 29 | 25 |
| 14 | 30 | 27 |
| 16 | 35 | 30 |
| 18 | 33 | 31 |
| 20 | 36 | 28 |
| 22 | 33 | 29 |

*Example 11*

A eutectic mixture of meta- and ortho-phenylene diamine was prepared by heating 80 parts of meta-phenlyene diamine to 65° C. whereupon 20 parts of the ortho isomer was added with stirring. Solution occurred in about 2–3 minutes and the mixture was allowed to cool. Precipitation of eutectic crystals occurred at approximately 43° C.

One hundred parts of polyether A was heated to about 45° C. and 16 parts of the above-described eutectic mixture was dissolved therein with stirring. The resin-forming composition was then cured in an oven at 95° C. for one hour. The composition gelled in about 15 minutes and after one hour had a Barcol hardness of 30 at the oven temperature. At room temperature (25° C.), the Barcol hardness was 45.

*Example 12*

To 77 parts of the eutectic mixture described in Example 11, there was added with stirring 23 parts of p,p'-diaminodiphenylmethane at about 45° C. Upon cooling to about 22° C., the mixture remained liquid, but solidified after about 24 hours. Fifteen parts of the liquid ternary eutectic was added to 100 parts of polyether A at room temperature. A casting of this mixture was cured in an air oven for one hour at 110° C. It set to a firm gel in 16 minutes and after one-half hour had a Barcol hardness of 10 at the oven temperature.

We claim as our invention:

1. A process for producing a fusible resinified product which comprises the steps of mixing free meta-phenylene diamine with glycidyl polyether of a polyhydric phenol having a 1,2-epoxy equivalency greater than 1.0 in amount of about 0.12 to 0.75 mol of the diamine per epoxide equivalent weight of the polyether, reacting the mixture by heating at about 50° C. to 280° C. until a fusible resinified product is formed, and then arresting the curing of the product before it becomes infusible by cooling to a temperature below about 40° C.

2. A process according to claim 1 wherein the polyhydric phenol is a dihydric phenol and the glycidyl polyether thereof has a 1,2-epoxy equivalency between 1.0 and 2.0.

3. A process according to claim 2 wherein an amount of about 0.2 to 0.4 mol of the diamine per epoxide equivalent weight of the polyether is used.

4. A process according to claim 2 wherein the dihydric phenol is 2,2-bis(4-hydroxyphenyl)propane, the glycidyl polyether thereof has an epoxide equivalent weight of about 175 to 600, and an amount of about 0.12 to 0.5 mol of the diamine per epoxide equivalent weight of the polyether is used.

5. A process according to claim 4 wherein the polyether has an epoxide equivalent weight of about 180 to 220, and the temperature is about 65° C.

References Cited in the file of this patent

UNITED STATES PATENTS

| | | |
|---|---|---|
| 2,637,716 | Ott | May 5, 1953 |
| 2,651,589 | Shokal et al. | Sept. 8, 1953 |
| 2,709,664 | Evans | May 31, 1955 |
| 2,717,885 | Greenlee | Sept. 13, 1955 |
| 2,723,241 | De Groote et al. | Nov. 8, 1955 |

FOREIGN PATENTS

| | | |
|---|---|---|
| 666,300 | Great Britain | Feb. 6, 1952 |